United States Patent [19]
Wisecarver

[11] Patent Number: 5,997,025
[45] Date of Patent: Dec. 7, 1999

[54] SELF LOCKING TRAILER HITCH

[75] Inventor: Warren R. Wisecarver, Walnut Creek, Calif.

[73] Assignee: Bishop-Wisecarver Corporation, Pittsburg, Calif.

[21] Appl. No.: 09/035,122

[22] Filed: Mar. 5, 1998

[51] Int. Cl.[6] .................................................. B60D 1/01
[52] U.S. Cl. ........................... 280/508; 280/510; 280/511
[58] Field of Search .................................... 280/504, 508, 280/509, 510, 511, 512

[56] References Cited

U.S. PATENT DOCUMENTS

| | | | |
|---|---|---|---|
| 1,335,211 | 3/1920 | Walker | 280/508 |
| 2,035,486 | 3/1936 | Larson | 280/33.15 |
| 2,347,033 | 4/1944 | Daton | 280/510 |
| 2,475,878 | 7/1949 | Clark et al. | 280/512 |
| 2,676,034 | 4/1954 | Tracey | 280/508 |
| 3,046,038 | 7/1962 | Hollis | 280/512 |
| 3,433,503 | 3/1969 | Davis | 280/512 |
| 3,650,546 | 3/1972 | Koenig | 280/423 |
| 3,796,443 | 3/1974 | Crutchfield | 280/406 |
| 4,042,256 | 8/1977 | Lepp | 280/512 |
| 4,792,151 | 12/1988 | Feld | 280/509 |
| 5,205,666 | 4/1993 | Hollis | 403/24 |

*Primary Examiner*—Lanna Mai
*Assistant Examiner*—Michael Cuff
*Attorney, Agent, or Firm*—Flehr Hohbach Test Albritton & Herbert LLP

[57] ABSTRACT

A trailer hitch (10) including a pair of clamping jaws (12) and a retractable jaw locking member in the form of a wedge block (84) that is spring biased to move between the jaws (12) in order to lock the jaws in a closed position about a hitch ball. A latch mechanism (94) secures the wedge block (84) in its retracted position away from the jaws (12). A plunger dog (46) is pivoted by a handle mechanism (28) to reposition wedge block (84) and a safety pin mechanism (64) is provided to secure the plunger dog (46) in position and thereby secure wedge block (84) in position.

20 Claims, 7 Drawing Sheets

SELF LOCKING TRAILER HITCH

TECHNICAL FIELD

The present invention pertains to ball and socket type trailer hitches for coupling a trailer to a towing vehicle.

BACKGROUND ART

U.S. Pat. No. 5,205,666 of Hollis discloses a trailer hitch of the ball and socket type wherein the socket is formed by a pair of opposed concave socket jaws that pivot between open and closed positions. In their closed position, the jaws align within the outer dimensions of a jaw locking bail, which pivots from an elevated retracted position to a forward, horizontal jaw-locking position. In its forward, locked position, the side walls of the bail completely enclose and engage the forward concave ends of the jaws, preventing the jaws from pivoting outwardly to their open, unlocked position. A drawback of the trailer hitch of Hollis is that it requires the jaw locking bail to be manually pivoted in order to lock the jaws in their closed position.

U.S. Pat. No. 4,042,256 of Lepp discloses a similar ball and socket type trailer hitch utilizing a pair of concave locking jaws and a closure lever that pivots over the locking jaws in their closed position and prevents them from pivoting outwardly to their open position. U.S. Pat. No. 3,046,038 of Hollis employs a similar concept.

The '266 patent, '256 patent, and '038 patent all have the common feature of an outer locking mechanism that secures the jaws in their closed position by enclosing the jaws from the outer sides of the jaws. There is a disadvantage in this approach in that it utilizes a "manually" operated locking mechanism, which can require more than one person to secure the trailer hitch to a towing vehicle.

DISCLOSURE OF INVENTION

Briefly described, the trailer hitch of the present invention comprises a pair of pivotally mounted clamping jaws each having a concavity for engaging and clamping onto a hitch ball, and a jaw locking member movable between a first position away from the jaws and a second position between the jaws in a manner preventing the jaws from pivoting to their open position.

According to an aspect of the invention, the jaws each include an extension projecting opposite the pivot from the concavity of the jaw so that, when the jaws are open, the extensions are closely spaced and, when the jaws are closed, the extensions are spaced farther from each other. In operation, with the jaws closed, the jaw locking member moves between the extensions to prevent the jaws from opening. Preferably, the jaw locking member wedges between the extensions and is biased therebetween to ensure a mechanical lock.

According to another aspect of the invention, a latch mechanism is provided for preventing movement of the jaw locking member from its first retracted position to its second locked position. The latch mechanism releases when the extensions of the locking jaws move far enough apart to allow the jaw locking member to move between the extensions. Preferably, the latch mechanism includes a deflectable trigger plate positioned within the path of movement of an extension, whereby engagement of an extension with the deflectable trigger plate releases the latch mechanism.

According to another aspect of the invention, a plunger dog is provided that is movable between a lock position and an unlock position in a manner that engages the jaw locking member in order to move the jaw locking member between its first and second positions. The jaw locking member includes opposed end walls and the plunger dog is positioned to engage one of the end walls and move the jaw locking member to its second position, when the plunger dog is moved to its lock position. The plunger dog also engages the other end wall and moves the jaw locking member to its first position, when the plunger dog is moved to its unlock position.

The present invention also comprises a trailer hitch with a pair of pivotally mounted clamping jaws each having a concavity for engaging a hitch ball and a jaw locking member movable between a first position away from the jaws that allows the jaws to pivot to their open position and a second position engaging the jaws in a manner preventing the jaws from pivoting to their open position, and biasing means for biasing the jaw locking member to its second position so that when the jaws close, the jaw locking member automatically moves to its second position and engages the jaws and prevents the jaws from pivoting to their open position. The provision of an automatic locking mechanism for securing the jaws in their closed position eliminates the need for manually performing this step, which can require a person to have to get out of the towing vehicle to secure the jaws.

The present invention also comprises a method of securing a hitch ball of a towing vehicle to a trailer hitch secured to a trailer, comprising the steps of positioning the hitch ball and the trailer hitch in close proximity, with a pair of pivotally mounted clamping jaws of the trailer hitch in an open position around the hitch ball. Each jaw has a concavity for engaging the hitch ball and the jaws are pivotal between an open position for positioning the jaws about the hitch ball and a closed position for clamping the jaws onto the hitch ball for towing purposes. Then the jaws are closed around the hitch ball by means of engagement of the hitch ball with the jaws, and finally a jaw locking member is automatically released from a first position away from the jaws to a second position between the jaws where the jaw locking member prevents the jaws from pivoting to their open position.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein.

BEST MODE OF CARRYING OUT THE INVENTION

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figures 1A, 1B:
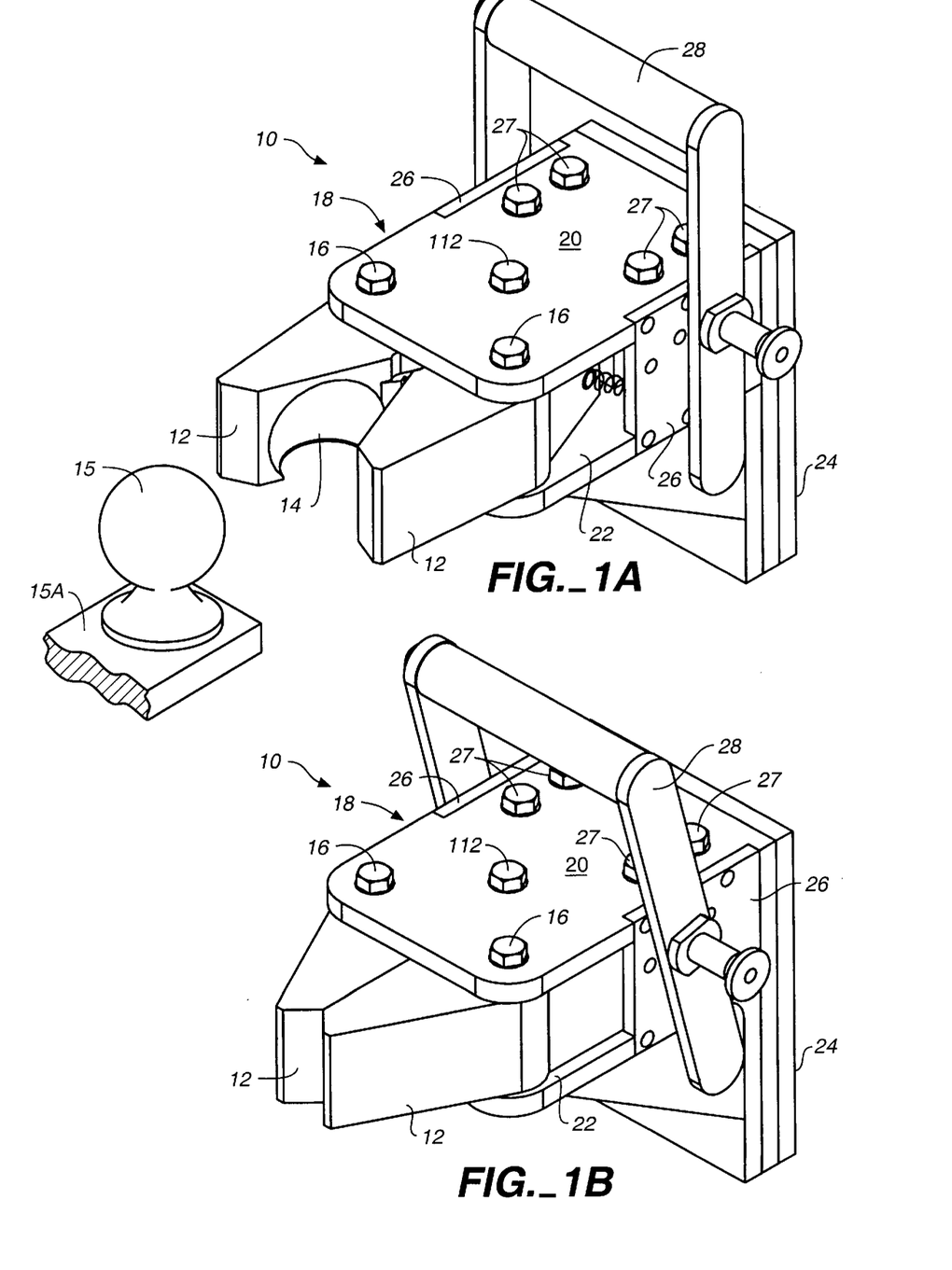
FIG. 1A is a pictorial view of the trailer hitch of the present invention, with its jaws in an open position.
FIG. 1B is a pictorial view of the trailer hitch of FIG. 1A, with the jaws in a closed position.

Referring to FIGS. 1A and 1B, the trailer hitch 10 of the present invention includes a pair of pivotal clamp jaws 12 that each have a half-socket recess 14 that is sized to fit around a hitch ball 15 of a trailer extension 15A. Clamp jaws 12 each pivot about a short vertical spacer bushing (shown in FIG. 2), secured by a bolt 16. Clamp jaws 12 extend out the front end of a substantially rectangular housing 18, which is formed by a top plate 20, a bottom plate 22, and a back plate 24. Bolts 27 hold together top plate 20 and bottom plate 22. Back plate 24 is a vertical plate that can be secured in any of a variety of ways to a trailer tongue. A pair of side plates 26 are secured at the back edges of top plate 20 and bottom plate 22 and are discussed in more detail with reference to FIGS. 11–14.

An upright handle mechanism 28 is provided for locking and unlocking clamp jaws 12. Handle mechanism 28 pivots from an upright position shown in FIG. 1A to an intermediate position shown in FIG. 1B to a forward locked position (not shown). The purpose of handle mechanism 28 is discussed in more detail later.

Figure 2:
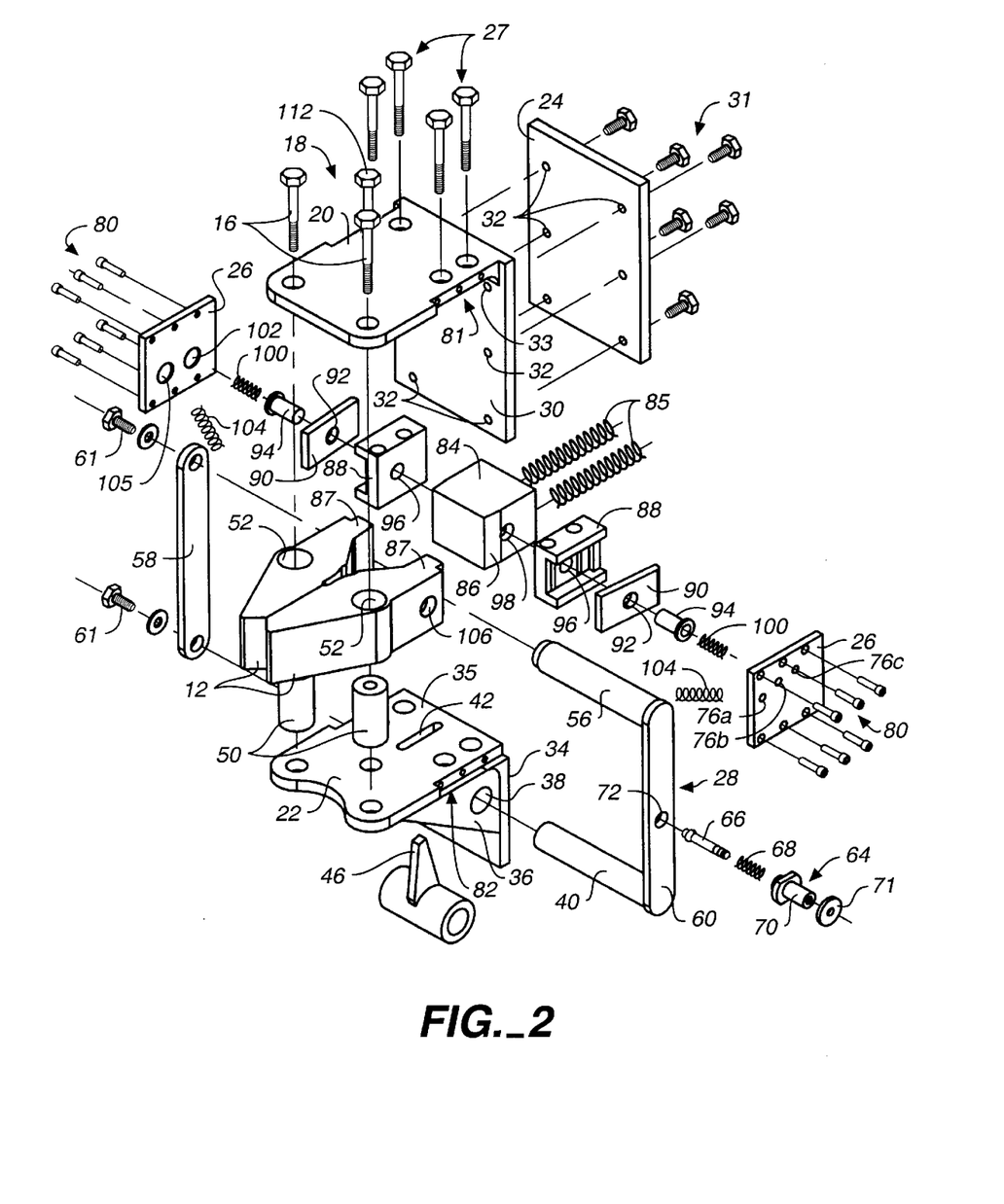
FIG. 2 is an exploded pictorial view of the trailer hitch of FIG. 1A.

FIG. 2 shows the various components of trailer hitch 10. Top plate 20 is L-shaped and includes a downwardly extending bottom angle wall 30 against which back plate 24 is secured by means of bolts 31. Bottom angle wall 30 include a series of clearance holes 32 and back plate 24 includes similar clearance holes 32' for receiving bolts 31, which secure back plate 24 and bottom angle wall 30 to a bottom angle 34 of bottom plate 22. Bottom angle wall 30 also includes a pair of threaded holes 33 (only one shown) that threadably receive the top two bolts 31 and secure back plate 24 to angle wall 30. Bottom angle wall 34 includes threaded holes (not shown) that align with the clearance holes 32 of wall 30 and back plate 24 and receive the bottom four bolts 31 to secure back plate 24 to bottom plate 22 and thereby align the upper flat portion 35 of bottom plate 22 in position below top plate 20.

Bottom plate 22 also includes a pair of gussets 36 (only one shown), which each have an opening 38 for rotatably receiving a pivot arm 40 of handle mechanism 28. The upper flat portion 35 of bottom plate 22 further includes a short longitudinal slot 42, which receives a plunger dog mechanism 46. Plunger dog mechanism 46 is secured to a short tubular segment 48 that mounts to pivot arm 40 between gussets 36.

A pair of upright tubular spacer bushings 50 sit within vertical bores 52 of clamp jaws 12 and are secured in position between top plate 20 and bottom plate 22 by means of bolts 16. Spacer bushings 50 are longer than the height of jaws 12 so that the bushings provide structural strength to housing 18 as well as proper clearance for jaws 12 to rotate freely.

Handle mechanism 28 includes, in addition to lower pivot arm 40, a second, upper handle arm 56, which is joined to lower pivot arm 40 by means of a pair of links 58, 60, and bolts 61. Pivot arm 40 and handle arm 56 are welded to link 60 and thereby permanently affixed to link 60 as an integral unit. The other link 56 bolts to arms 40, 56 for support and is removable by means of bolts 61 to allow for disassembly of the unit.

An indexing pin release mechanism 64 is mounted to the outside of link 60, and includes an indexing pin 66, a spring 68, a guide mount 70 and a knob 71. Guide mount 70 is secured to link 60, by a threaded shoulder projection which screws into threaded hole 72, and indexing pin 66 is secured to knob 71 and is slidably received within guide mount 70. Spring 68 biases pin 66 through hole 72 so that the head of the pin inserts into one of three holes 76a, 76b, 76c in side plate 26 for securing handle mechanism 28 in a selected position.

Side plates 26 are secured to top plate 20 and bottom plate 22 by means of bolts 80, the upper ones of which extend into holes 81 of top plate 20, and the bottom ones of which extend into holes 82 of bottom plate 22.

A wedge block 84 is movably positioned within enclosure of housing 18 and includes tapered front edges 86. Wedge block 84 also includes a pair of internal longitudinal bores (not shown) for receiving a pair of biasing springs 85, which bias wedge block 84 forward between the rear extensions 87 of clamp jaws 12. As discussed later, wedge block 84 slides between extensions 87 and is wedged therebetween to hold clamp jaws 12 in a closed position. The wedge shape created by the tapered front edges 86 of wedge block 84 assists in repositioning the block between the jaw extensions and in securely holding the block therebetween by means of friction. This tapered wedge design ensures that any vibration from use will tighten rather than loosen jaws 12 due to the biasing force of springs 85 and the wedge design.

A pair of stationary, internal C-shaped mounts 88 are secured within housing 18, one on each side of wedge block 84. Mounts 88 are the same height as spacer bushings 50 and allow clearance for the jaws. Mounts 88 are fixed in position by bolts 27 and thereby form part of the structural frame of housing 18. Mounts 88 function to guide, and provide clearance for, wedge block 84 as it moves forward into position between clamp jaws 12. A latch release trigger plate 90 is housed within the cavity of each C-shaped mount 88 and includes a hole 92 for receiving a latch pin 94. Mounts 88 include aligned holes 96 and wedge block 84 includes aligned sockets 98, which also receive latch pins 94. Springs 100 are provided to bias latch pins 94 into a latched position with pins 94 extending into sockets 98. Side plates 26 each include a large diameter socket 102 for receiving the head of latch pins 94.

A pair of side springs 104 are positioned between side plates 26 and rear extensions 87 of jaws 12. Side plates 26 include recesses 105 and rear extensions 87 include similar recesses 106 for receiving opposite ends of side springs 104. Side springs 104 bias jaws 12 into their open position.

Figure 3:
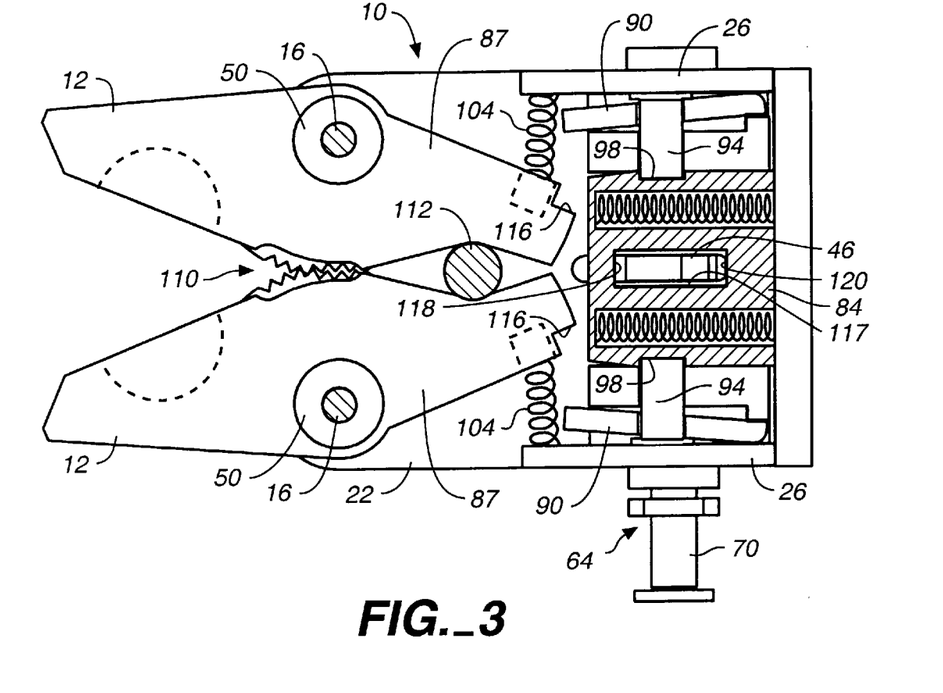
FIG. 3 is a plan view of the trailer hitch of FIG. 1 with the top cover plate removed and the jaws open and the wedge block retracted and latched.

Referring to FIG. 3, each jaw 12 includes a set of inner teeth 110, which intermesh with the teeth of the other jaw to ensure that the jaws open and close in a uniform manner. Also, a vertical bolt 112 is secured between plates 20, 22 between the rear extensions 87 of jaws 12. Bolt 112 functions to prevent one jaw from over pivoting beyond the longitudinal centerline of the trailer hitch, which might otherwise occur when the trailer hitch is backed up off center or out of alignment onto a hitch ball.

The rear extension 87 of each jaw 12 also includes a corner cut 116 at its outer corner, which is designed to create a shoulder for receiving the forward end of a latch release trigger plate 90, as discussed later. In FIG. 3, jaws 12 are shown in their open position, where the rear extensions 87 are close together and contact bolt 112.

Wedge block 84 includes a longitudinal slot 117, which is longitudinally aligned with the longitudinal slot in bottom plate 22. Slot 117 includes a front end wall 118 and a back end wall 120, which are opposed end walls. Wedge block 84 is placed in a retracted position (to the right as shown) by means of dog 46, which protrudes up into slot 117 and engages the back end of the slot. When dog 46 is pivoted backwards (to the right), the dog pushes block 84 back away from jaws 12 into its retracted position shown in FIG. 3.

When wedge block 84 is in a retracted position, latch pins 94 are biased into sockets 98 of wedge block 84 and thereby hold the block in its retracted position, allowing dog 46 to be repositioned, as discussed later. Latch pins 94 are biased into sockets 98 by internal springs (not shown). The heads of latch pins 94, in turn, bias latch release trigger plates 90 inwardly away from side plates 26.

Figure 4:
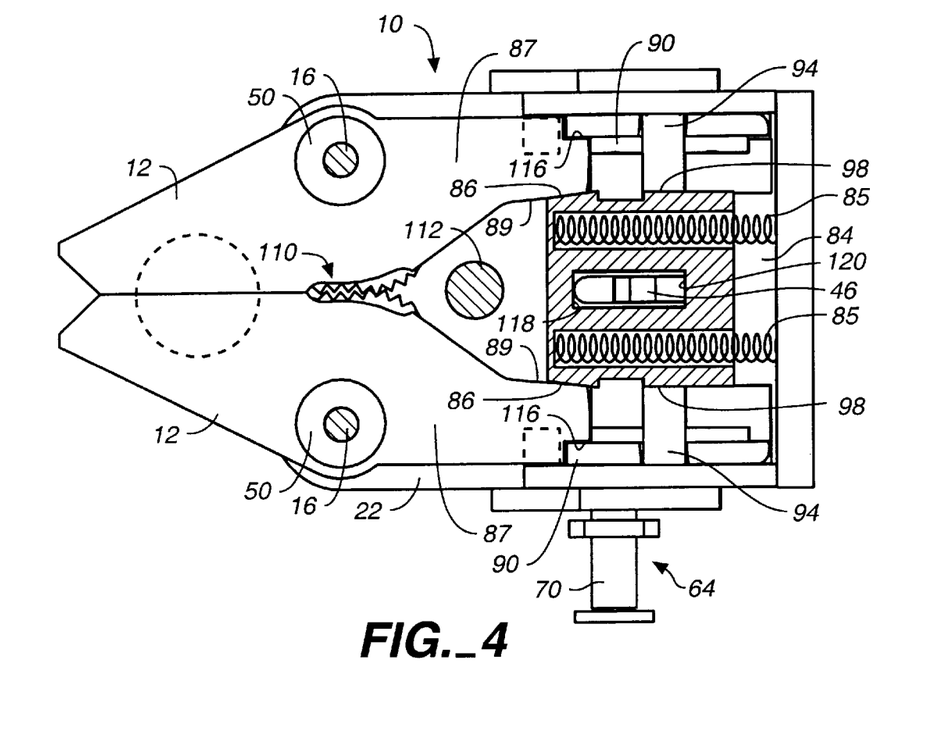
FIG. 4 is a plan view like FIG. 3 showing the wedge block in a forward, locked position.

In FIG. 4, jaws 12 are closed and wedge block 84 is spring biased forward by springs 85 to its forward position between jaws 12. In this position, the tapered front edges 86 of wedge block 84 are wedged between the tapered inside surfaces 89 of the rear extensions 87 of the jaws. In this sense, wedge block 84 acts as a jaw locking member that "locks" or secures the jaws in their closed position.

When wedge block 84 is in its forward position, latch pins 94 are unlatched from sockets 98 due to the shoulders 116 of closed jaws 12 displacing the forward ends of latch release trigger plates 90. By displacing trigger plates 90 outwardly, jaws 12 cause latch pins 94 to retract from the sockets 98 of wedge block 84, thereby releasing the wedge block and allowing the spring force of springs 85 to shift the wedge block forward.

Figure 5:
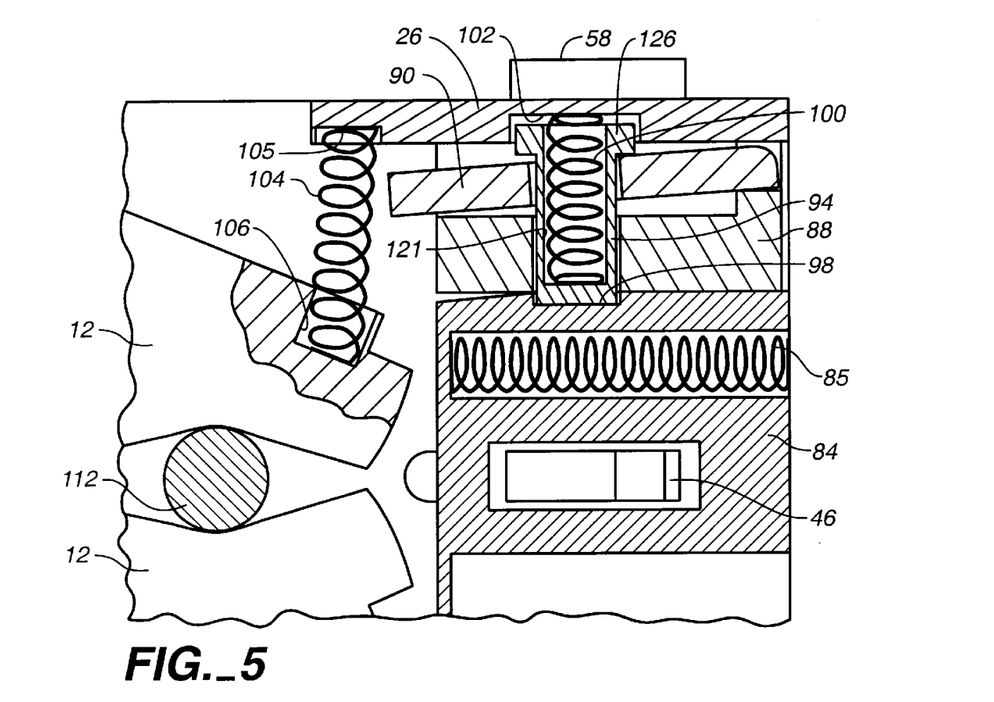
FIG. 5 is a plan view of the latch mechanism with the latch pin in a latched position and the jaws open.

In FIG. 5, wedge block 84 is retracted and latched by latch pins 94. Latch pins 94 include an internal bore 121 for locating springs 100. The outer ends of springs 100 engage the inside surface of recess 102 in side plate 26. The inner ends of springs 100 engage the inner end of bore 121 and thus bias latch pin 94 inwardly, away from side plate 26. The heads 126 of pins 94 are partially within sockets 102 of side plates 26 and are displaced a short distance from the inside wall of the plates 26. In this position, springs 100 bias latch pins 94 inwardly in a manner where the heads of the latch pins 94 engage the outer side of latch release trigger plates 90, and thus deflect the latch release plates inwardly.

Figure 6:
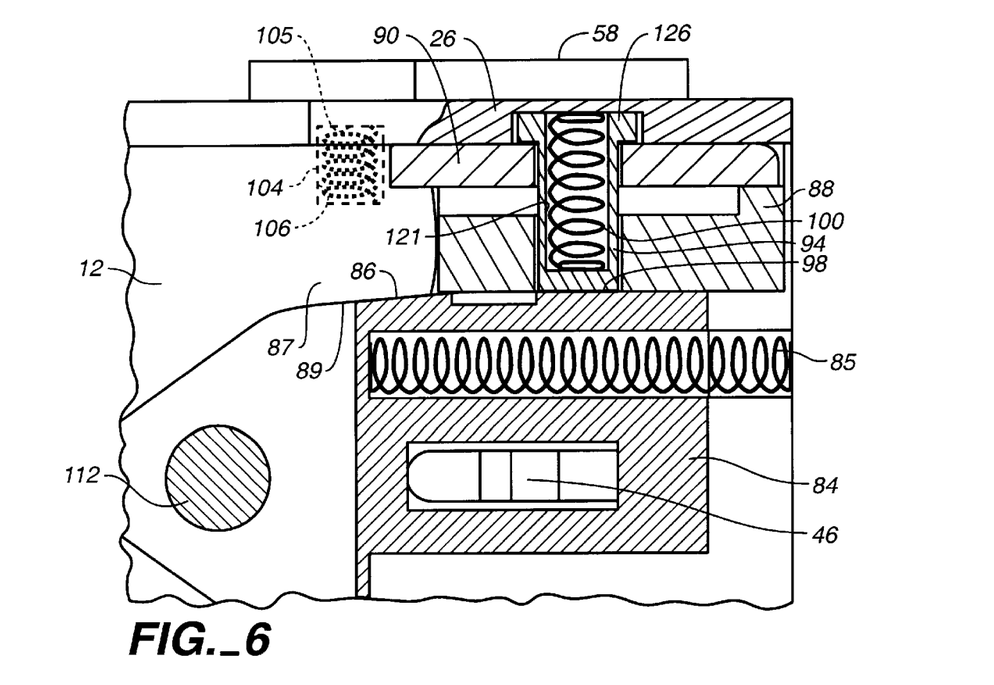
FIG. 6 is a plan view like FIG. 5 of the latch pin in an unlatched position and the jaws closed.

In FIG. 6, the rear extensions 87 of jaws 12 have displaced latch release plates 90 outwardly, which causes plates 90 to outwardly displace latch pins 94 so that the latch pin heads 126 move sideways and the inner ends of latch pins 94 move out of sockets 98. With latch pins 94 released, wedge block 84 advances forward between jaws 12 due to the spring force of springs 85.

Also shown in FIG. 6, the tapered inside surface 89 of rear extensions 87 frictionally engage the tapered surface 86 of wedge block 84 when the wedge block 84 is in its forward, locked position. A wedge design improves the mechanical lock of wedge block 84 by maintaining the mechanical lock as surfaces 86, 89 wear over time.

Figure 7:
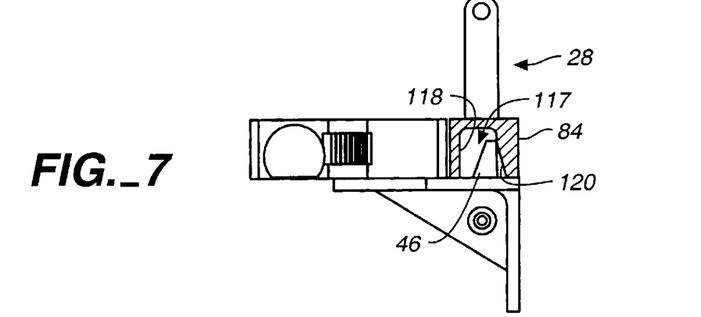
FIGS. 7–10 are sectional views of the trailer hitch showing the handle and the dog in four different positions.

Referring to FIGS. 7–10, the operation of handle mechanism 28 and dog mechanism 46 is illustrated in these figures. In FIG. 7, handle 28 is fully upright and pivoted backwards. In this position, dog 46 engages the back end wall 120 of slot 117 and thereby places wedge block 84 in its retracted position.

Figure 8:
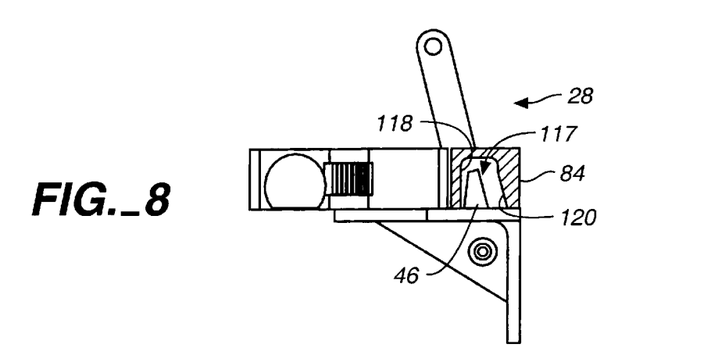

In FIG. 8, handle 28 is pivoted forward to a middle, neutral position, which positions dog 46 adjacent the front end wall 118 of slot 117, but does not cause dog 46 to engage and reposition wedge block 84. This position is considered a "ready" position, where the jaws are open and are ready to receive a hitch ball.

Figure 9:
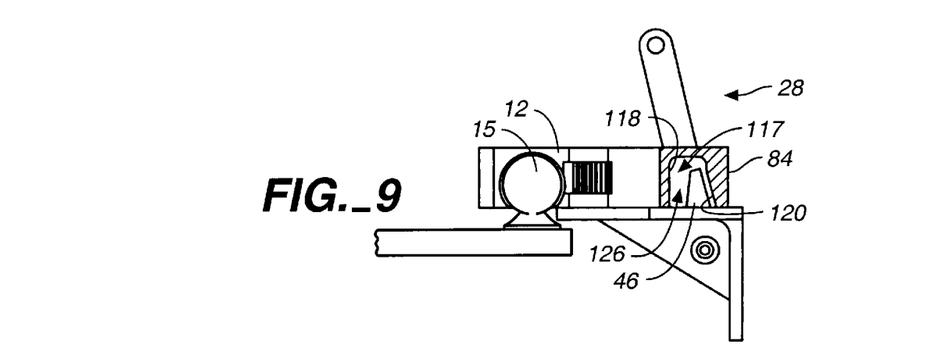

In FIG. 9, wedge block 84 has shifted forward, due to the engagement of a hitch ball 15 and clamp jaws 12, which closes jaws 12 onto the hitch ball 15, releases the latch pins, and allows the block springs to reposition tapered wedge block 84 forward. In this position, the back end wall 120 of slot 117 is moved up adjacent to dog 46, which creates a gap 126 between dog 46 and the front end wall 118 of slot 117. Also, there is a slight gap between dog 46 and back end wall 117. In this position, dog 46 is spaced from end wall 118, 120, which allows wedge block 84 to wedge fully between jaws 12.

Figure 10:
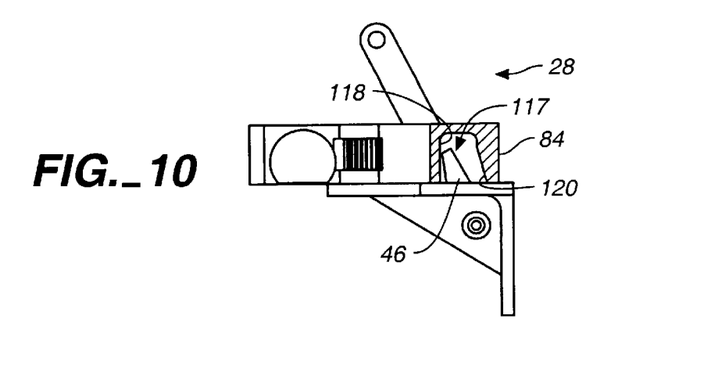

In FIG. 10, handle 28 has been manually pivoted forward to its locked position, which causes dog 46 pivot forward and engage the front end of slot 117. In this position, dog 46 holds wedge block 84 in its forward position between the jaws, and thus creates a mechanical lock of tapered wedge block 84.

The range of motion of plunger dog 46 is defined by the plunger dog's lock position, as shown in FIG. 10, and its unlock position, as shown in FIG. 7. The length of slot 117 of wedge block 84 is such that the plunger dog is able to engage the opposite end walls 118, 120 and thereby cause the wedge block to reposition.

Figure 11:
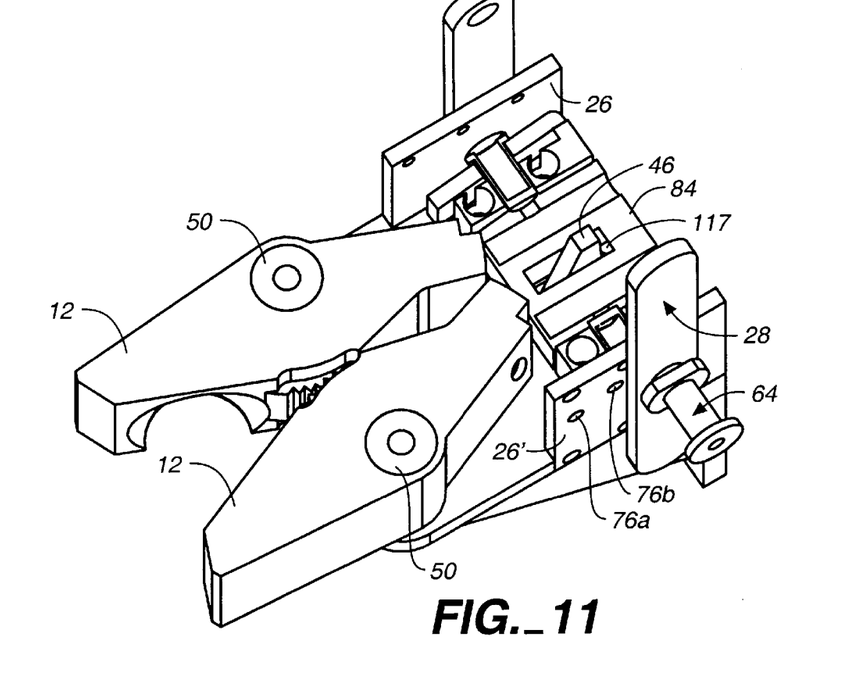
FIGS. 11–14 are pictorial views illustrating the sequence of operation of the trailer hitch.

FIGS. 11–14 correspond to FIGS. 7–10, and show the three different positions of dog 46 and handle mechanism 28, as well as the two positions of wedge block 84. In FIG. 11, handle mechanism 28 is upright and dog 46 is pivoted backward against the back end of slot 117 in wedge block 84. Holes 76a, 76b, 76c comprise the holes 76 identified in FIG. 2. These three holes provide three spaced receptacles for receiving the safety pin of safety pin mechanism 64. In its upright position, handle mechanism 28 positions the safety pin for insertion into hole 76c (which can be seen in FIG. 12). With the safety pin biased into hole 76c, dog 46 is locked in its rear position, thus preventing wedge block 84 from shifting forward.

Figure 12:
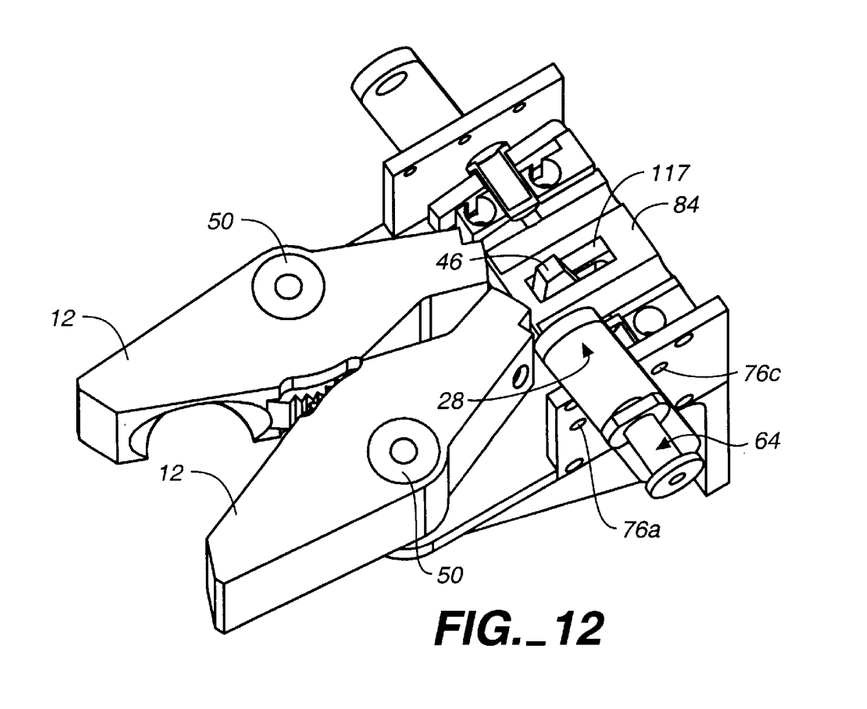
Figure 13:
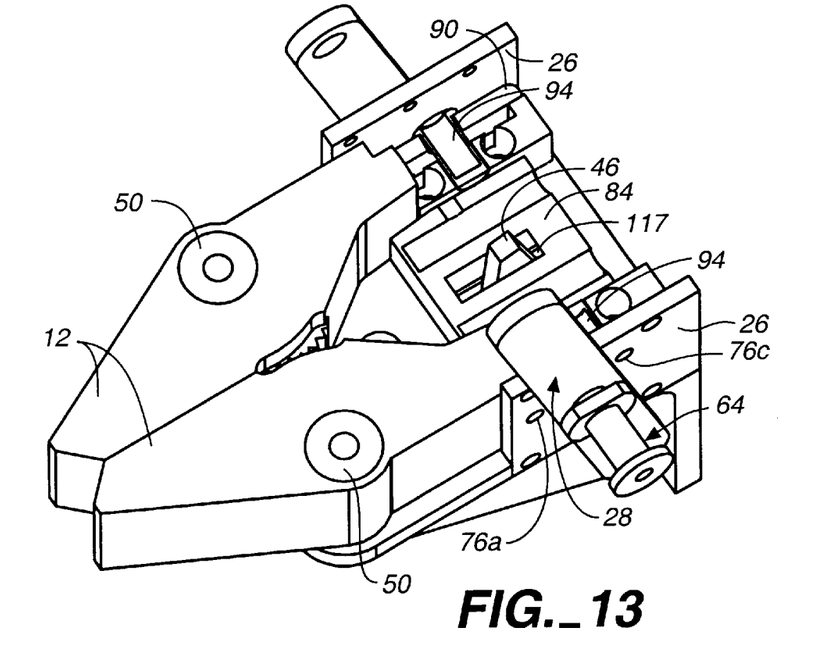

In FIG. 12, handle mechanism 28 is shifted forward into its middle, ready position, which positions dog 46 at the forward end of slot 117. In this position, the safety pin inserts into middle hole 76b, thus securing the dog 46 in position to allow the wedge block 84 to shift forward when a hitch ball engages and closes jaws 12, which is shown in FIG. 13. When jaws 12 close, latch release plates deflect outwardly, which releases latch pins 94 from within the sockets of wedge block 84, allowing the wedge block to shift forward into position between jaws 12.

Figure 14:
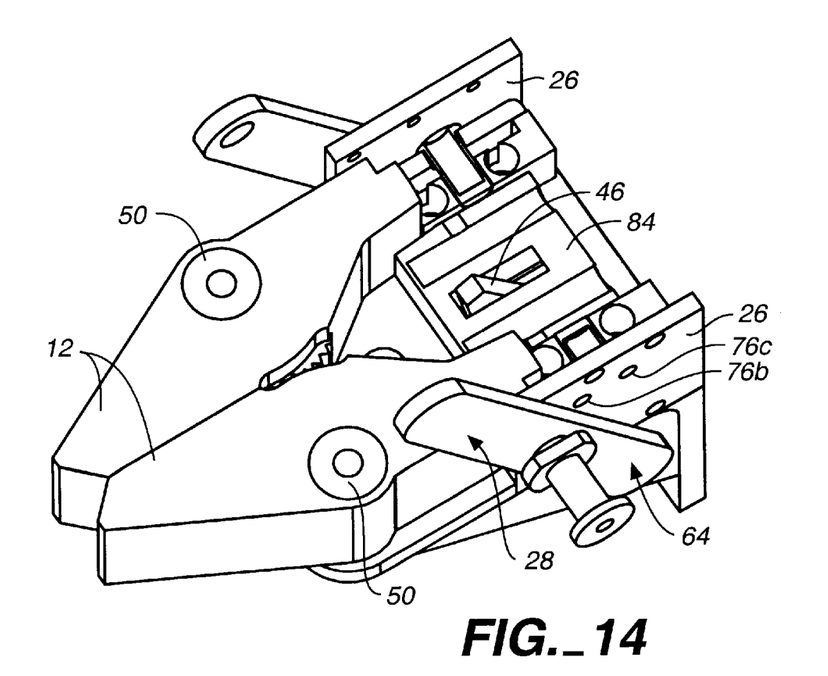

After wedge block 84 shifts forward, dog 46 becomes repositioned at the back end of slot 117. This allows dog 46 to be shifted forward by pivoting of handle mechanism 28 to its forward most position, as shown in FIG. 14. In this position, dog 46 pushes against wedge block 84 at the forward end of slot 117. The safety pin of pin mechanism 64 inserts into hole 76a when handle mechanism 28 is completely forward and thereby locks wedge block 84 in position between jaws 12, thus providing a positive mechanical safety lock if springs 85 should fail. To retract wedge block 84 from between jaws 12, the indexing pin is released and handle mechanism 28 is pivoted backwards to its original upright position, which causes dog 46 to engage and shift the wedge block backward.

Also, when the wedge block shifts backward out from between the jaws, the jaws open due to the spring force of the side springs 104. This allows the trailer hitch to be easily separated from the hitch ball.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

What is claimed is:

1. A trailer hitch, comprising a pair of pivotally mounted clamping jaws each having a concavity for engaging a hitch ball, the jaws being pivotal between an open position permitting positioning of the jaws about the hitch ball and a closed position where the jaws are adapted to clamp onto the hitch ball for towing purposes, and a jaw locking member movable between a first position away from the jaws and a second position between the jaws in a manner preventing the jaws from pivoting to their open position, and further comprising, a plunger dog movable between a lock position and an unlock position, for moving the jaw locking member between its first and second positions, the jaw locking member including opposed end walls, the plunger dog being positioned to engage one of the end walls and move the jaw locking member to its second position, when the plunger dog is moved to its lock position, the plunger dog also positioned to engage the other end wall and move the jaw locking member to its first position, when the plunger dog is moved to its unlock position.

2. The trailer hitch of claim 1 and further comprising, a latch mechanism for preventing movement of the jaw locking member from its first position to its second position, wherein the latch mechanism releases when the extensions of the locking jaws move far enough apart to allow the jaw locking member to move between the extensions.

3. The trailer hitch of claim 2 wherein, the latch mechanism includes a deflectable trigger plate positioned within the path of movement of a jaw extension, whereby engagement of an extension with the deflectable trigger plate releases the latch mechanism.

4. The trailer hitch of claim 3 wherein, the deflectable trigger plate is spring biased so as to position the latch mechanism in a secured, non-released position.

5. The trailer hitch of claim 2 and further comprising, biasing means for biasing the jaw locking member to its second position.

6. The trailer hitch of claim 5 wherein, the biasing means causes the jaw locking member to automatically move to its second position when the jaws close.

7. The trailer hitch of claim 2 wherein, the jaw locking member includes forward corners that are tapered and the inner surfaces of the extensions are also tapered so that the jaw locking member wedges between the extensions and is at least partially secured therebetween by friction when the jaw locking member moves into its second position.

8. The trailer hitch of claim 1 wherein, the jaw locking member is mounted to automatically move from its first to its second position when the jaws pivot to their closed position.

9. The trailer hitch of claim 1, and further comprising an index mechanism for securing the plunger dog in its lock and unlock positions.

10. The trailer hitch of claim wherein, the indexing mechanism includes a neutral position allowing the plunger dog to move between lock and unlock positions.

11. The trailer hitch of claim 1 and further comprising, means for securing the plunger dog in its lock and unlock positions.

12. A trailer hitch, comprising a pair of pivotally mounted clamping jaws each having a concavity for engaging a hitch ball, the jaws being pivotal between an open position for positioning the laws about the hitch ball and a closed position for clamping onto the hitch ball for towing purposes, a jaw locking member movable between a first position away from the laws that allows the jaws to pivot to their open position and a second position engaging the jaws in a manner preventing the jaws from pivoting to their open position, and biasing means for biasing the jaw locking member to its second position so that when the jaws close, the jaw locking member automatically moves to its second position and engages the jaws and prevents the jaws from pivoting to their open position, and further comprising, a latch for holding the law locking member in its first position, the latch mechanism being releasable from the law locking member upon closing of the jaws, the latch includes a release mechanism for releasing the latch from the law locking member, the release mechanism adapted to release the latch upon engagement with the laws when the jaws close;

the release mechanism is spring biased to position the latch in a latching position, and wherein the end of one of the jaws opposite its concavity engages the release mechanism when the jaws fully close; and the release mechanism comprises a pivotal member movable at one end by the end of said jaw.

13. The trailer hitch of claim 12 wherein, the jaw locking member includes tapered surfaces, and the jaws include tapered surfaces, so that the jaw locking member wedges between the jaws when the jaw locking member moves into its second position.

14. A towing assembly, comprising a hitch ball secured to a towing vehicle, a trailer extension extending forwardly from a trailer to be towed by the towing vehicle, and a trailer hitch secured to the trailer extension for coupling the trailer extension to the hitch ball, the trailer hitch including;

a pair of pivotally mounted clamping jaws each having a concavity for engaging the hitch ball, the jaws being pivotal between an open position for positioning the jaws about the hitch ball and a closed position for clamping the jaws onto the hitch ball for towing purposes, and a jaw locking member movable between a first position away from the jaws and a second position between the jaws in a manner preventing the jaws from pivoting to their open position, and wherein each jaw includes an extension projecting opposite the pivot from the concavity of the jaw, wherein in their opening position, the extensions of the jaws are closely spaced and in their closed position, the extensions are spaced farther from each other, and wherein the jaw locking member is movable between the extensions to prevent the jaws from pivoting to their open position, and wherein the jaw locking member is mounted to automatically move between the jaws when the jaws pivot to their closed position wherein, movement of the jaw locking member from its first position to its second position is prevented by a latch mechanism that releases when the extensions of the locking jaws move far enough apart to allow the jaw locking member to move between the extensions and wherein, the latch mechanism includes a pivotal member positioned within the path of movement of an extension, whereby engagement of an extension with the pivotal member releases the latch mechanism.

15. The trailer hitch of claim 14 wherein, the pivotal member is spring biased to position the latch mechanism in a secured, latched position.

16. The trailer hitch of claim 14 wherein, the jaw locking member includes forward comers that are tapered and the extensions include tapered inner surfaces so that the jaw locking member wedges between the extensions and is at least partially secured therebetween by friction when the jaw locking member moves into its second position.

17. A towing assembly, comprising a hitch ball secured to a towing vehicle, a trailer extension extending forwardly from a trailer to be towed by the towing vehicle, and a trailer hitch secured to the trailer extension for coupling the trailer extension to the hitch ball, the trailer hitch including:

a pair of pivotally mounted clamping jaws each having a concavity for engaging the hitch ball, the jaws being pivotal between an open position for positioning the jaws about the hitch ball and a closed position for clamping the jaws onto the hitch ball for towing purposes, and a jaw locking member movable between a first position away from the jaws and a second position between the jaws in a manner preventing the jaws from pivoting to their open position, and the trailer hitch further comprising, a plunger dog movable between a lock position and an unlock position, for moving the jaw locking member between its first and second positions, the jaw locking member including opposed end walls, the plunger dog positioned to engage one of the end walls and move the jaw locking member to its second position, when the plunger dog is moved to its locking position, the plunger dog also positioned to engage the other end wall and move the jaw locking member to its first position, when the plunger dog is moved to its unlock position.

18. A method of securing a hitch ball of a towing vehicle to a trailer hitch secured to a trailer, comprising the steps of positioning the hitch ball and a trailer hitch in close proximity, with a pair of pivotally mounted clamping jaws of the trailer hitch in an open position around the hitch ball, each jaw having a concavity for engaging the hitch ball, the jaws being pivotal between an open position for positioning the jaws about the hitch ball and a closed position for clamping the jaws onto the hitch ball for towing purposes, closing the jaws around the hitch ball by means of engagement of the hitch ball with the jaws, and when the jaws close, automatically releasing a jaw locking member from a first position away from the jaws to a second position between the jaws where the jaw locking member prevents the jaws from pivoting to their open position wherein, the step of releasing the jaw locking member includes releasing a latch mechanism that holds the jaw locking member in its first position wherein, the step of releasing the latch mechanism includes positioning a release mechanism in the path of movement of the jaws, so that when the jaws move to their closed position, the release mechanism releases the latch mechanism wherein, the jaws move from their open position to their closed position in a manner that ensures equal and uniform motion wherein, movement of the jaw locking member from its first position to its second position is prevented by a latch mechanism that releases when the locking laws move far enough apart to allow the jaw locking member to move therebetween wherein, the latch mechanism includes a deflectable trigger plate positioned within the path of movement of an extension, whereby engagement of an extension with the deflectable trigger plate releases the latch mechanism.

19. The method of claim 18 wherein, the deflectable trigger plate positions the latch mechanism in a secured, non-released position by spring bias.

20. A method of securing a hitch ball of a towing vehicle to a trailer hitch secured to a trailer, comprising the steps of positioning the hitch ball and a trailer hitch in close proximity, with a pair of pivotally mounted clamping jaws of the trailer hitch in an open position around the hitch ball, each jaw having a concavity for engaging the hitch ball, the jaws being pivotal between an open position for positioning the jaws about the hitch ball and a closed position for clamping the jaws onto the hitch ball for towing purposes, closing the jaws around the hitch ball by means of engagement of the hitch ball with the jaws, when the jaws close, automatically releasing a jaw locking member from a first position away from the jaws to a second position between the jaws where the jaw locking member prevents the jaws from pivoting to their open position and, retracting the jaw locking member by a plunger dog movable between a lock position and an unlock position, for moving the jaw locking member between its first and second positions, the jaw locking member including opposed end walls, the plunger dog positioned to engage one of the end walls and move the jaw locking member to its second position, when the plunger dog is moved to its lock position, the plunger dog also positioned to engage the other end wall and move the jaw locking member to its first position, when the plunger dog is moved to its unlock position.

* * * * *